3,282,931
DIBENZYLIDENE-BENZENEDIACETONITRILES
Ferdinand B. Zienty, Warson Woods, and Myron J. Holm, St. Louis, Mo., assignors to Monsanto Company, a corporation of Delaware
No Drawing. Filed Feb. 2, 1962, Ser. No. 170,833
8 Claims. (Cl. 260—240)

This invention relates to condensation products of aromatic aldehydes with aromatic diacetonitriles, and more particularly to the condensation products of benzaldehydes with benzenediacetonitriles.

The compounds of this invention are generally identified as dibenzylidenebenzenediacetonitriles and are characterized by the following structural formula:

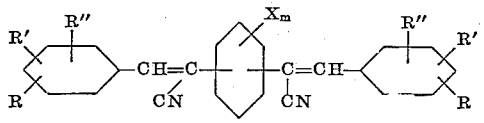

wherein R is a monovalent substituent selected from the group consisting of hydroxy and hydroxyalkoxy, acyloxy, sulfonoxy and epoxyalkoxy groups containing from 1 to 18 carbon atoms, R' and R" are monovalent substituents selected from the group consisting of hydrogen, hydroxy, hydroxyalkoxy, epoxyalkoxy, halogens, nitro, and alkoxy, aryloxy, acyloxy, sulfonoxy, acyl and alkyl groups containing from 1 to 18 carbon atoms, with all hydroxy groups being in the meta or para positions, X is a monovalent substituent selected from the group consisting of halogens, nitro and methyl groups, and m is an integer from 0 to 4 inclusive.

The term "sulfonoxy" is used herein to identify groups having the following structure: R—SO$_2$—O—.

The dibenzylidenebenzenediacetonitriles of the present invention can be prepared by the condensation of a benzaldehyde with a benzenediacetonitrile. The benzenediacetonitrile used can be ortho, meta, or para, as well as mixtures of these isomers in any proportion. In most instances it is preferred to employ as starting materials benzaldehydes and benzenediacetonitriles having the substituents required in the reaction product. However, unsubstituted reactants can be employed and the substituents then introduced into the molecule. Alternately, the substituents can be modified after condensation. In the course of these reactants two moles of a benzaldehyde combine with one mole of the benzenediacetonitrile. Thus the reactants are preferably used in these approximate proportions. However, it will be readily appreciated that deviations from the 2:1 molar proportion in the reaction mixtures may at times be dictated by the relative ease of specific reactions and other related factors. As will be brought out more fully hereinafter, the reaction is catalytically induced and is executed in a suitable inert solvent system.

Substituted benzaldehydes that can be used in accordance with this invention include:

mono-, di-, and tri- hydroxybenzaldehydes
mono- and difluoro- hydroxybenzaldehydes
mono- and dichloro-hydroxybenzaldehydes
mono- and dinitro-hydroxybenzaldehydes
mono- and dimethoxy-hydroxybenzaldehydes
mono- and dibenzoyloxy-hydroxybenzaldehydes
mono- and dimethyl-hydroxybenzaldehydes
mono- and dihydroxy-hydroxyethoxybenzaldehydes
mono- and dichloro-hydroxyethoxybenzaldehydes
mono- and dinitro-hydroxyethoxybenzaldehydes
mono- and dimethoxy-hydroxyethoxybenzaldehydes
mono- and dibenzoyl-hydroxyethoxybenzaldehydes
mono- diacetoxy-hydroethoxybenzaldehydes
mono- and dimethyl-hydromethoxybenzaldehydes
mono-, di-, and triacetoxybenzaldehydes
mono- and dihydroxy-acetoxybenzaldehydes
mono- and dichloro-acetoxybenzaldehydes
mono- and dinitro-acetoxybenzaldehydes
mono- and dimethoxy-acetoxybenzaldehydes
mono- and dibenzoyloxy-acetoxybenzaldehydes
mono- and dimethyl-acetoxybenzaldehydes
epoxypropoxy benzaldehydes
mono- and dihydroxy-epoxypropoxybenzaldehydes
mono- and dichloro-epoxypropoxybenzaldehydes
mono- and dinitro-epoxypropoxybenzaldehydes
mono- and dimethoxy-epoxypropoxybenzaldehydes
mono- and dibenzoyloxy-epoxypropoxybenzaldehydes
mono- and dimethyl-epoxypropoxybenzaldehydes
mono- and dibromo-hydroxybenzaldehydes
mono- and diiodo-hydroxybenzaldehydes
mono- and dethoxy-hydroxybenzaldehydes
mono- and dipropoxy-hydroxybenzaldehydes
mono- and dibenzyloxy-hydroxybenzaldehydes
mono- and diallyloxy-hydroxybenzaldehydes
allyl-hydroxybenzaldehydes
bromo-nitro-hydroxybenzaldehydes
bromo-ethoxy-hydroxybenzaldehydes
mono- and dichloro-hydroxypropoxy-benzaldehydes
mono- and dichloro-hydroxypropoxy-hydroxybenzaldehydes
acetyl-mono- and dihydroxybenzaldehydes
acetyl-methoxy-hydroxybenzaldehydes
mono- and dicyclohexyloxy-hydroxybenzaldehydes
mono- and ditridecyloxy-hydroxybenzaldehydes
mono- and di-tert-butyl-hydroxybenzaldehydes
mono- and di-(2,3-dihydroxypropoxy)-benzaldehydes
mono- and di-(2-hydroxypropoxy)-benzaldehydes
mono- and diphenoxy-hydroxybenzaldehydes
mono- and di-(4-chlorophenoxy)-hydroxybenzaldehydes While the above list enumerates all of the types of substituted benzaldehydes, in the interest of clarity and brevity no attempt has been made to specifically name each individual member of this group. The remaining substituted benzaldehydes that can be employed differ only in the number of carbon and other atoms in the substituents or in the particular halogen used. Thus in the above tabulation the chlorine can in each instance be replaced with bromine, fluorine, or iodine, the carbonaceous substituents replaced with their homologs containing as many as eighteen carbon atoms, and other substituents replaced with their homologs and analogs.

The benzenediacetonitrile to be condensed with the benzaldehyde can be ortho, meta, or para, substituted or unsubstituted. When a plurality of substituents are present they can all be the same or dissimilar. Suitable substituted benzenediacetonitriles include:

mono-, di-, tri- and tetra-halobenzenediacetonitriles
mono-, di-, tri- and tetra-chlorobenzenediacetonitriles
mono-, di-, tri- and tetra-fluorobenzenediacetonitriles
mono-, di-, tri- and tetra-bromobenzenediacetonitriles
mono-, di-, tri and tetra-iodobenzenediacetonitriles
mono-, di-, tri- and tetra-nitrobenzenediacetonitriles
mono- and di-phenylbenzenediacetonitriles
mono- and di-tolylbenzenediacetonitriles
mono-, di-, tri-, and tetra-methylbenzenediacetonitriles
mono- and di-propylbenzenediacetonitriles
mono- and di-butylbenzenediacetonitriles
mono- and di-laurylbenzenediacetonitriles
mono- and di-stearylbenzenediacetonitriles, and the like.

Mixed halo-, haloalkyl-, haloaryl-, halonitro-, nitroalkyl-, nitroaryl-, benzenediacetonitriles and the like can also be employed. Examples of suitable benzenediacetonitriles of these groups include chlorofluoro-, chlorobromo-, chloroiodo-, fluorobromo-, fluoroiodo-, bromochloro-, bromoiodo-, chlorobromoiodo-, chloronitro-, bromonitro-, phenylnitro-, phenylchloro-, phenylchloronitro-benzenediacetonitriles and the like.

The process of the present invention is carried out by dissolving the reactants in an inert solvent system, and maintaining the solution until the reaction is complete. The completion of the reaction is generally evidenced by precipitation of the reaction product from the solution. The compounds thus obtained are readily separated from the reaction mixture by conventional means such as decantation, distillation and the like. The preferred solvents are the lower aliphatic mono-hydroxy alcohols containing from one to three carbon atoms inclusive. However, other inert solvents such as benzene, tetrahydrofuran, chloroform, and the like can be used. The reaction system is rendered alkaline by the introduction of a base such as, for example, sodium ethoxide, sodium hydroxide, or potassium methoxide. For optimum results the reaction is activated with a suitable catalyst such as piperidine, piperidinium acetate, pyridine, triethylamine, triethylenediamine and the like. With most reactants the reaction can be carried out at approximately room temperature. However, elevated temperatures up to the boiling point of the system can be used to expedite the procedure.

The compounds of the present invention are relatively high melting materials, many of them exhibiting liquid crystallinity. This phenomenon, also known as mesomorphism, is best demonstrated when the compounds are heated above their melting point. As the temperature is gradually elevated, the compounds are transformed from the crystalline state to a turbid melt which at still higher temperatures is abruptly clarified. The turbid condition is considered to be an intermediate state between the solid and liquid states in which the molecules have attained freedom of movement in certain directions but are still constrained in others. This turbidity appears to be due to the presence of a large number of small zones, with the molecules in a given zone being all similarly constrained, and thus showing different optical properties in different directions. The turbid state is stable through an approximate range of 10 to 90 or more degrees centigrade. This inherent characteristic of the compounds under consideration materially enhances their utility and versatility since normally liquid state reactions, such as polymerizations, can be carried out in this state in which the molecules are held in an orientation much more restricted than is obtainable in the liquid state.

The invention will be further clarified by reference to detailed descriptions of the preparation of compounds encompassed thereby. Unless otherwise specified, all proportions in these examples and throughout the specification are expressed in parts by weight.

EXAMPLE 1

*α,α'-bis-(p-hydroxybenzylidene)-p-benzenediacetonitrile*

About 61 grams (0.5 mole) of p-hydroxybenzaldehyde and 39 grams (0.25 mole) of p-benzenediacetonitrile were dissolved in a mixture of 500 ml. of normal propanol and 30 ml. of acetic acid in a suitable reaction vessel provided with heating means, an agitator, and a reflux system having means for returning the condensate through a bed of anhydrous calcium sulfate or other dehydrating agent. The solution was blanked with nitrogen and the nitrogen atmosphere was maintained throughout the course of the reaction. After the inert atmosphere was established, the solution was agitated and heated to about 80° C. Then 50 ml. of piperidine was added. Heating was increased so that the solvent boiled, and the vapors passed to the condenser. The condensate then returned through the drying system. After a heating period of about 24 hours during which a precipitate separated, the reaction mixture was cooled to complete precipitation of the resultant α,α' - bis-(p-hydroxybenzylidene)-p-benzenediacetonitrile. The precipitate was collected, washed with normal propanol and then with methanol. This procedure resulted in a yield of approximately 80%. The product melted at about 385° C., was slightly soluble in hot tetrahydrofuran, soluble in dimethylformamide and warm aqueous alkali, and gave the following analysis: Calcd. for $C_{24}H_{16}N_2O_2$ (364.39): C, 79.1; H, 4.4; N, 7.7. Found: C, 78.6; H, 4.4; N, 7.1.

Yields can be increased by extending the heating period and by using an excess of the benzaldehyde. For example, a substantial repetition of the above process with a 25% excess of p-hydroxybenzaldehyde resulted in a 95% yield (based on benzenediacetonitrile) of α,α'-bis-(p-hydroxybenzaldehyde)-p-benzenediacetonitrile.

The procedure of Example 1 was followed in the condensation of other phenolic benzaldehydes with substituted and unsubstituted ortho, meta and para benzenediacetonitriles. In executing this process the following bis-(hydroxybenzylidene) - benzenediacetonitriles (I) are prepared by condensing two moles or a slight excess (up to 25%) of the appropriate benzaldehyde (II) with one mole of a benzenediacetonitrile (III).

EXAMPLE 2

I. α,α' - bis - (m - hydroxybenzylidene) - p - benzenediacetonitrile
II. m-hydroxybenzaldehyde
III. p-benzenediacetonitrile

EXAMPLE 3

I. α,α' - divanillylidene - p - benzenediacetonitrile
II. vanillin
III. p-benzenediacetonitrile

EXAMPLE 4

I. α,α' - bis - (3 - ethoxy - 4 - hydroxybenzylidene)-p-benzenediacetonitrile
II. 3-ethoxy-4-hydroxybenzaldehyde
III. p-benzenediacetonitrile

EXAMPLE 5

I. α,α' - bis - (p - hydroxybenzylidene)-m-benzenediacetonitrile
II. p-hydroxybenzaldehyde
III. m-benzenediacetonitrile

EXAMPLE 6

I. α,α' - bis - (2,3 - dihydroxybenzylidene)-p-benzenediacetonitrile
II. 2,3-dihydroxybenzaldehyde
III. p-benzenediacetonitrile

EXAMPLE 7

I. α,α' - bis - (3,4,5 - trihydroxybenzylidene)-p-benzenediacetonitrile
II. 3,4,5-trihydroxybenzaldehyde
III. p-benzenediacetonitrile

EXAMPLE 8

I. α,α - bis - (3 - chloro - 4 - hydroxybenzylidene)-p-benzenediacetonitrile
II. 3-chloro-4-hydroxybenzaldehyde
III. p-benzenediacetonitrile

EXAMPLE 9

I. α,α' - bis - (3,5 - dichloro - 4 - hydroxybenzylidene)-m-benzenediacetonitrile
II. 3,5-dichloro-4-hydroxybenzaldehyde
III. m-benzenediacetonitrile

EXAMPLE 10

I. α,α',bis - (4 - hydroxy - 3-nitrobenzylidene)-p-benzenediacetonitrile
II. 4-hydroxy-3-nitrobenzaldehyde
III. p-benzenediacetonitrile

EXAMPLE 11

I. α,α',bis - 3,5 - dinitro - 4 - hydroxybenzylidene)-o-benzenediacetonitrile

II. 3,5-dinitro-4-hydroxybenzaldehyde
III. o-benzenediacetonitrile

EXAMPLE 12

I. α,α' - bis - (3 - hydroxy - 4 - methoxybenzylidene)-p-benzenediacetonitrile
II. 3-hydroxy-4-methoxybenzaldehyde
III. p-benzenediacetonitrile

EXAMPLE 13

I. α,α' - bis - (3 - benzoxy - 4 - hydroxybenzylidene)-p-benzenediacetonitrile
II. 3-benzoxy-4-hydroxybenzaldehyde
III. p-benzenediacetonitrile

EXAMPLE 14

I. α,α' - bis - (3,5 - diethyl - 4 - hydroxybenzylidene)-m-benzenediacetonitrile
II. 3,5-diethyl-4-hydroxybenzaldehyde
III. m-benzenediacetonitrile

EXAMPLE 15

I. α,α' - bis - (3, 5 - difluoro - 4 - hydroxybenzylidene)-tetrafluoro-p-benzenediacetonitrile
II. 3,5-difluoro-4-hydroxybenzaldehyde
III. tetrafluoro-p-benzenediacetonitrile

EXAMPLE 16

I. α,α' - bis - [4 - hydroxy - 2 - (2 - hydroxyethoxy)-benzylidene]-p-benzenediacetonitrile
II. 4-hydroxy-2-(2-hydroxyethoxy)-benzaldehyde
III. p-benzenediacetonitrile

EXAMPLE 17

α,α'-bis-(p-2-hydroxyethoxybenzylidene)-p-benzenediacetonitrile

About 58 grams (.38 mole) of p-2-hydroxyethoxybenzaldehyde and 25.9 grams (.19 mole) of p-benzenediacetonitrile were introduced into about 300 ml. of 95% ethanol at room temperature and solution effected heating to approximately 70° C. The solution was cooled to 40°, agitated, and maintained at this temperature while about 1 ml. of a solution of sodium ethoxide made from one gram of sodium and 100 ml. of 95% ethanol was slowly added. This resulted in a turbid mixture which became progressively thicker in consistency. The reaction mixture was kept at a temperature of about 30° C. for two hours. The thick mass was filtered and the precipitate washed with 600 ml. of ethanol followed by 500 ml. of water. The resultant product was a yellow crystalline material. After recrystallization from tetrahydrofuran it melted to the liquid crystalline state at about 240° C., to a clear liquid at about 290° C., and gave the following analysis: Calcd. for $C_{28}H_{24}N_2O_4$ (452.49): C, 74.3; H, 5.3; N, 6.2. Found: C, 73.9; H, 5.2; N, 6.0.

In similar fashion, a series of other α,α'-bis-(hydroxyalkoxybenzylidene)-benzenediacetonitriles was prepared by the condensation of appropriate benzaldehydes and nitriles in molar ratios of approximately 2:1. The following examples illustrate a number of the bis-(hydroxyalkoxybenzylidene)-benzenediacetonitriles (I) that may be readily prepared in this manner by the reaction of a hydroxyalkoxybenzaldehyde (II) and a benzenediacetonitrile (III).

EXAMPLE 18

I. α,α'- - bis - [p - (2 - hydroxyethoxy)-benzylidene]-m-benzenediacetonitrile
II. p-2-hydroxyethoxybenzaldehyde
III. m-benzenediacetonitrile

EXAMPLE 19

I. α, α' - bis - (p - hydroxybutoxybenzylidene)-o-benzenediacetonitrile
II. p-hydroxybutoxybenzaldehyde
III. o-benzenediacetonitrile

EXAMPLE 20

I. α, α' - bis - (3 - bromo-4-hydroxypropoxybenzylidene)-tetrabromo-p-benzenediacetonitrile
II. 3-bromo-4-hydroxypropoxybenzaldehyde
III. tetrabromo-p-benzenediacetonitrile

EXAMPLE 21

I. α,α' - bis - (-4-hydroxystearoxy-3-nitrobenzylidene)-2-methyl-p-benzenediacetonitrile
II. 4-hydroxystearoxy-3-nitrobenzaldehyde
III. 2-methyl-p-benzenediacetonitrile

EXAMPLE 22

I. α,α' - bis - (3-hydroxyethoxy-2-stearoxybenzylidene)-p-benzenediacetonitrile
II. 3-hydroxyethoxy-2-stearoxybenzaldehyde
III. p-benzenediacetonitrile

EXAMPLE 23

I. α,α' - bis - (3 - benzoyloxy-4-hydroxybutyroxybenzylidene)-2-nitro-p-benzenediacetonitrile
II. 3-benzoyloxy-4-hydroxybutyroxybenzaldehyde
III. 2-nitro-p-benzenediacetonitrile

EXAMPLE 24

I. α,α'-bis-(2-butyl-4-hydroxyethoxybenzylidene)-2-phenyl-p-benzenediacetonitrile
II. 2-butyl-4-hydroxyethoxybenzaldehyde
III. 2-phenyl-p-benzenediacetonitrile

EXAMPLE 25

I. α,α'-bis-{p-[2(2-hydroxyethoxy)-ethoxy]-benzylidene}-p-benzenediacetonitrile
II. p-[2-(2-hydroxyethoxy)-ethoxy]-benzaldehyde
III. p-benzenediacetonitrile

EXAMPLE 26

I. α,α' - bis - {p - {2-{2-[2-(2-hydroxyethoxy) - ethoxy]-ethoxy} - ethoxy}-benzylidene}-m-benzenediacetonitrile
II. p-{2-{2-[2 - (2-hydroxyethoxy) - ethoxy] - ethoxy}-ethoxy}-benzaldehyde
III. m-benzenediacetonitrile Bis-(acyloxy) benzenediacetonitriles can be prepared by condensation reactions executed in substantially the same manner as set forth in the preceding examples. However, in order to facilitate the formation of these compounds, it is preferred to synthesize them by condensation of the hydroxy group of the corresponding hydroxy derivative with a monocarboxylic or sulfonic acid or their anhydrides or halides, in the presence of a basic catalyst. A detailed description of a preferred embodiment of such a procedure is set forth below.

EXAMPLE 27

α,α'-bis-(p-butyroyloxybenzylidene)-p-benzenediacetonitrile

About 36.5 grams (0.1 mole) of α,α'-bis-(p-hydroxybenzylidene-p-benzenediacetonitrile made in accordance with the procedure of Example 1 was suspended in a mixture of about 200 ml. of butyric anhydride and 2 ml. pyridine and the mixture heated to the boiling point (about 200° C.) for an hour. The solution was then cooled to about room temperature, causing the precipitation of α,α'-bis-(p-butyroyloxybenzylidene)- p -benzenediacetonitrile. The crystals were collected by filtration and washed successively with acetic acid, methanol and ether. After recrystallization from 1,1,2-trichloroethane the crystals melted to the liquid crystalline state at about 214° C., to a clear liquid at about 292° C., and gave the following analysis. Calcd. for $C_{32}H_{28}N_2O_4$ (504.56): C, 76.2; H, 5.6; N, 5.5. Found: C, 76.2; H, 5.5; N, 5.4.

EXAMPLE 28

α,α'-bis-(p-propionyloxybenzylidene)-p-benzenediacetonitrile

A suspension of about 124 grams of α,α'-bis-(p-hydroxybenzylidene)-p-benzenediacetonitrile in a mixture of 500 ml. of propionic anhydride and 5 ml. of pyridine was introduced into a closed reaction vessel provided with a fractionating column, an agitator and heating means. The suspension was stirred continuously and heated to its boiling point of about 165° C. The distillate was thus removed at the rate of about 100 ml. per hour and replaced with increments of propionic anhydride containing about 5% pyridine. The rate of addition was sufficient to maintain the volume of the reaction mixture substantially constant. After about one and a quarter hours, all of the material in suspension had gone into solution. The clear solution was maintained at its boiling point for about an hour and fifteen minutes and then slowly cooled to room temperature. This resulted in the formation of yellow-orange needle-like crystals of α,α'-bis-(p-propionyloxybenzylidene)-p-benzenediacetonitrile which were separated from the mother liquor, washed successively with acetic anhydride, acetic acid and methanol, and then recrystallized from chloroform. The material thus obtained melted to the liquid crystal state at about 233° C. and to a clear melt at about 305° C.

EXAMPLE 29

α,α'-bis-(4-acetoxy-3-methoxybenzylidene)-p-benzenediacetonitrile

About 5 grams of α,α'-divanillylidene-p-benzenediacetonitrile was suspended in 50 ml. of acetic anhydride and about 25 ml. of pyridine were added to the suspension. The suspended solid began to go into solution immediately upon formation of the suspension, but after a few minutes a precipitate suddenly formed and thickened the mixture. After about 15 minutes, the precipitate was separated from the reaction mixture. This material was purified by heating to about 118° C. for approximately 30 minutes with acetic acid. The resultant α,α'-bis-(4-acetoxy-3-methoxybenzylidene)-p-benzenediacetonitrile was then recrystallized from 1,1,2-trichloroethane to provide short yellow needles melting at about 270° C.

While the above three examples are concerned with the condensation of a bis(hydroxybenzylidene)-benzenediacetonitrile and an acid anhydride, the acylation can be accomplished with equal facility using the acid itself or an acylhalide thereof. Suitable acids for use in this capacity include formic, acetic, propionic, butyric, valeric, caproic, enanthic, caprylic, pelargonic, capric, undecanoic, lauric, tridecanoic, myristic, pentadecanoic, palmitic, margaric, stearic, benzoic, chlorobenzoic, toluic, naphthoic, chloroacetic, bromoacetic, crotonic, butenoic, undecylenic, oleic, phenylacetic, cyclohexanecarboxylic, cyclobutanecarboxylic, methanesulfonic and the like. Such acids can, in general accordance with the preceding example, be condensed with the hydroxybenzylidene derivatives set forth in Examples 1 through 16 in the preparation of the corresponding bis-(acyloxy)-benzenediacetonitrile.

EXAMPLE 30

α,α'-bis-[p-(2,3-epoxypropoxy)-benzylidene]-p-benzenediacetonitrile

A mixture of about 122 grams of p-hydroxybenzaldehyde, 277 grams of epichlorohydrin, and 50 ml. of benzene was heated to boiling in a flask equipped with a stirrer, dropping funnel, thermometer and Dean-Stark trap of 25 ml. capacity modified by the addition of a bottom outlet. About 234 ml. of an aqueous solution containing 1.1 mole of potassium hydroxide was added from the dropping funnel to this boiling reaction mixture over a four-hour period while water was being removed. At the completion of this time the excess epicholorohydrin was removed under vacuum. The residue was diluted with chloroform, and the potassium chloride was removed by filtration. Washing of the chloroform solution with dilute aqueous alkali produced an emulsion which was broken by the addition of carbon tetrachloride. After the removal of substantially all alkalinity by water washing, the solvents were evaporated and the residue was vacuum distilled.

About 59.5 grams of p-(2,3-epoxypropoxy)-benzaldehyde as prepared above and 26 grams of p-benzenediacetonitrile were dissolved in 500 ml. of 95% ethanol at 60° C. Then a 6% ethanolic solution of sodium ethoxide was added carefully until a yellow color developed. This required about 4 ml. of the solution. In a few minutes precipitation began. The temperature rose slowly for ½ hour, then dropped. An additional 3 ml. of the alkali caused no effect. After a total of 2 hours the precipitate was collected, washed with ethanol, water and finally methanol. Recrystallization was accomplished by extraction in a Soxhlet extractor with 1,1,2-trichloroethane to yield a material melting to a turbid liquid at about 240° and clearing at 258°. For purposes of analysis a sample was recrystallized three times from 1,1,2-trichloroethane, the solubility in the hot solvent decreasing from 3% to 1.2%. The sample softened at 239° C., melted to a turbid liquid at 242–243° C. and cleared at about 260° C.

*Analysis.*—Calcd. for $C_{30}H_{24}N_2O_4$ (476.51): C, 75.61; H, 5.08; N, 5.88. Found: C, 75.31, 75.49; H, 5.01, 5.09; N, 5.6.

Related benzenediacetonitrile derivatives can be prepared by methods following the teachings of the present invention. Representative bis-(epoxyalkoxybenzylidene)-benzenediacetonitriles (I) that are made by condensation of a substituted benzaldehyde (II) with a benzenediacetonitrile (III) are set forth below.

EXAMPLE 31

I. α,α' - bis - [4-hydroxy-3-(2,3-epoxypropoxy)-benzylidene]-m-benzenediacetonitrile
II. 4-hydroxy-3-(2,3-epoxypropoxy)-benzaldehyde
III. m-benzenediacetonitrile

EXAMPLE 32

I. α,α' - bis-[3,5-difluoro-4-(2,3-epoxypropoxy)-benzylidene]-p-benzenediacetonitrile
II. 3,5-difluoro-4-(2,3-epoxypropoxy)-benzaldehyde
III. p-benzenediacetonitrile

EXAMPLE 33

I. α,α'-bis-[3,5-dinitro-4-(2,3 - epoxypropoxy) - benzylidene]-tetranitro-p-benzenediacetonitrile
II. 3,5-dinitro-4-(2,3-epoxypropoxy)-benzaldehyde
III. tetranitro-p-benzenediacetonitrile

EXAMPLE 34

I. α,α'-bis - [4-(2,3-epoxypropoxy) - 3 - methoxybenzylidene]-o-benzenediacetonitrile
II. 4-(2,3-epoxypropoxy)-3-methoxybenzaldehyde
III. o-benzenediacetonitrile

EXAMPLE 35

I. α,α'-bis - [4-(2,3-epoxypropoxy) - 2 - methoxybenzylidene]-tetrachloro-p-benzenediacetonitrile
II. 4-(2,3-epoxypropoxy) - 2 - methoxybenzaldehyde
III. tetrachloro-p-benzenediacetonitrile

EXAMPLE 36

I. α,α'-[4-benzoyloxy - 3 - (2,3-epoxypropoxy) - benzylidene]-phenyl-p-benzenediacetonitrile
II. 4-benzoyloxy-3-(2,3-epoxypropoxy)-benzaldehyde
III. phenyl-p-benzenediacetonitrile

EXAMPLE 37

I. α,α'-bis-[2-butyl-4-(2,3-epoxypropoxy) - benzylidene]-p-benzenediacetonitrile
II. 2-butyl-4-(2,3-epoxypropoxy)-benzaldehyde
III. p-benzenediacetonitrile

EXAMPLE 38

I. α,α'-bis-(3-methoxy-4-epoxystearoxybenzylidene) - p - benzenediacetonitrile

II. 4-epoxystearoxy-3-methoxy-benzaldehyde
III. p-benzenediacetonitrile

The compounds prepared in accordance with the present invention are high melting crystalline materials which are insoluble in water but readily soluble in a wide variety of commercially available solvents. They are of particular value as resin intermediates and also useful as reactive intermediates in the preparation of plasticizers, flame proofing agents, fungistats, insecticides, herbicides, bacteriostats, gear oil additives, high temperature grease additives and the like. The epoxyalkoxy derivatives are particularly worthy of note as resin intermediates. When combined with suitable reactants such as p-toluenesulfonic acid, tough, high strength resins having excellent adhesion are obtained. Also the hydroxyalkoxy, hydroxy and acyloxy derivatives show fungistatic activity, while bacteriostatic activity is exhibited by the hydroxy and acyloxy compounds. Good insecticidal and herbicidal activity has been experienced with the hydroxy derivatives, and the epoxyalkoxy compounds show definite herbicidal characteristics in addition to their other advantageous properties.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A di-(epoxyalkoxybenzylidene) - benzenediacetonitrile having the structural formula:

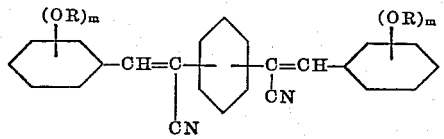

wherein R is epoxyalkoxy containing from 3 to 18 carbon atoms inclusive, and
m is an integer from 1 to 3 inclusive.

2. A compound of the formula,

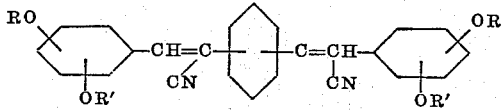

wherein R is hydrocarbon containing from 1 to 18 carbon atoms inclusive, and
R' is epoxyalkoxy containing from 3 to 18 carbon atoms inclusive.

3. A compound of the formula,

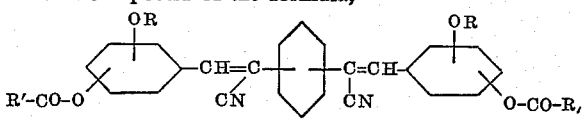

wherein R is hydrocarbon containing from 1 to 18 carbon atoms inclusive, and
R' is hydrocarbon containing from 1 to 17 carbon atoms inclusive.

4. A compound of the formula,

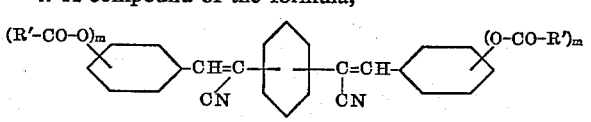

wherein R' is hydrocarbon containing from 1 to 17 carbon atoms inclusive, and
m is an integer from 1 to 3 inclusive.

5. A compound of the formula,

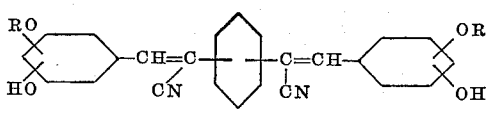

wherein R is hydrocarbon containing from 1 to 18 carbon atoms inclusive.

6. A di - (hydroxybenzylidene) - benzenediacetonitrile having the structural formula:

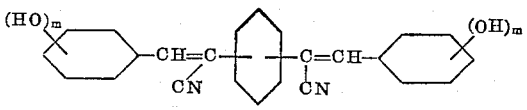

wherein $m$ is an integer from 1 to 3 inclusive, and OH groups being in other than the ortho positions.

7. A di-(hydroxyalkoxybenzylidene) - benzenediacetonitrile having the structural formula:

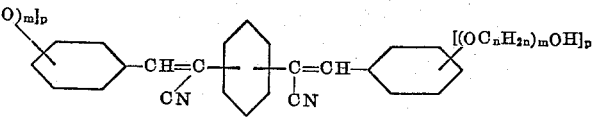

wherein $n$ is an integer from 1 to 18 inclusive,
$m$ is an integer from 1 to 10 inclusive, and
$p$ is an integer from 1 to 3 inclusive.

8. A compound of the formula,

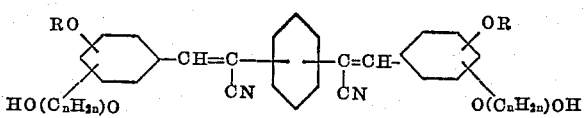

wherein R is hydrocarbon containing from 1 to 18 carbon atoms inclusive, and
$n$ is an integer from 1 to 18 inclusive.

References Cited by the Examiner

UNITED STATES PATENTS

| | | | |
|---|---|---|---|
| 2,527,426 | 10/1950 | Keller et al. | 260—507 |
| 2,774,782 | 12/1956 | Rorig | 260—465 |
| 2,815,363 | 12/1957 | Rorig | 260—465 |
| 3,097,227 | 7/1963 | Williams | 260—465 |

FOREIGN PATENTS 1,086,553  8/1960  Germany.

OTHER REFERENCES

Waldmann et al.: "Ann," vol. 527, pages 183–9 (1937).
Kauffmann, Ber. d. Deut. Chem. Ges., vol 50, pp 515–25 (1917).
Schmitt et al.: Bull. Soc. Chem., France, vol. 23, pp. 636–642 (1956).
The Condensed Chemical Dictionary, 5th Ed., Reinhold Pub. Corp., p. 120 (1956).
Campbell et al.: Journal of Org. Chem., vol. 24 pp. 1246–1251 (Sept. 1959).
Hoi et al.: "Rec. trav. chim.," vol. 74, pages 1119–24 (1955).

CHARLES B. PARKER, *Primary Examiner.*

IRVING MARCUS, JOSEPH P. BRUST, J. P. FRIEDENSON, R. V. HINES, *Examiners.*